United States Patent [19]

McDaniel

[11] Patent Number: 4,972,906

[45] Date of Patent: Nov. 27, 1990

[54] METHOD FOR SELECTIVE PLUGGING OF A ZONE IN A WELL

[75] Inventor: Stephen J. McDaniel, Lafayette, La.

[73] Assignee: Conoco Inc., Ponca City, Okla.

[21] Appl. No.: 404,133

[22] Filed: Sep. 7, 1989

[51] Int. Cl.$^5$ ...................... E21B 33/138; E21B 43/04
[52] U.S. Cl. .................................. 166/276; 166/295; 166/300; 166/313
[58] Field of Search ............... 166/164, 276, 278, 295, 166/300, 313; 405/264, 266, 267; 523/130, 132

[56] References Cited

U.S. PATENT DOCUMENTS

| | | | |
|---|---|---|---|
| 3,123,138 | 3/1964 | Robichaux | 166/295 |
| 3,176,768 | 4/1965 | Branot et al. | 166/295 |
| 3,208,525 | 9/1965 | Caldwell et al. | 166/295 |
| 3,308,884 | 3/1967 | Robichaux | 166/295 |
| 3,401,747 | 9/1968 | Coulter, Jr. et al. | 166/295 |
| 3,416,604 | 12/1968 | Rensvold | 166/295 |
| 3,709,296 | 1/1973 | Glenn, Jr. | 166/253 |
| 3,933,204 | 1/1976 | Knapp | 166/295 |
| 4,034,811 | 7/1977 | Sparlin et al. | 166/295 |
| 4,042,031 | 8/1977 | Knapp | 166/276 |

Primary Examiner—George A. Suchfield

[57] ABSTRACT

A mixture of a liquid epoxy material and a hardener is selectively placed in a well traversing a subterranean formation adjacent to a zone in said formation which is to be plugged. The mixture is displaced into the zone and allowed to harden, thereby plugging the zone. The process is particularly applicable to sealing off water production in a gravel-packed well. A positive displacement bailer may be effectively used to deliver the mixture to the zone. The epoxy material used is immiscible with and is heavier than the fluid in the well. The epoxy material is further characterized as being essentially free of solids and having a low viscosity at downhole conditions of temperature and pressure. The hardener has an activation temperature which is lower than the downhole formation temperature.

1 Claim, 5 Drawing Sheets

WELL PRODUCTION HISTORY

METHOD FOR SELECTIVE PLUGGING OF A ZONE IN A WELL

BACKGROUND OF THE INVENTION

Two basic factors which are especially prevalent in typical producing oil and gas wells in the Gulf of Mexico and the surrounding coastal regions have created the need for a new plugging technique. First, the majority of oil and gas wells in the Gulf Coast region produce from reservoirs which are commonly classified as water-drive type reservoirs. In a water-drive reservoir, the predominant mechanism which forces the movement of oil or gas in the reservoir toward the wellbore is the advancement of a formation water aquifer. The formation water phase is found beneath the oil or gas phase in a "bottom-water" reservoir or on the outer flanks of the oil or gas column in an "edge-water" reservoir. In either case, water moves into the rock pore spaces which were once filled with hydrocarbon fluids in response to continued production of oil or gas. Over time, this natural water encroachment leads to the advancement of water into the producing interval, and the well eventually begins to produce quantities of formation water. As the influx of water continues in the reservoir, the percentage of produced water, as compared to total fluid production, increases with time.

The ever increasing production rate of formation water is undesirable in both oil and gas wells. In the case of an oil well, the energy required and correspondingly the cost required to artificially lift a given volume of oil from a well must be proportionately increased if formation water is being produced together with the oil. Therefore, the reduction or elimination of water production from an oil well is economically advantageous since: (a) lifting costs to produce the oil are reduced, and (b) costs associated with the treatment and proper disposal of the produced waste water are lowered.

In the case of a gas well, the production of even relatively low quantities of formation water can be detrimental to the productivity of the well. When formation water and natural gas enter the wellbore, each fluid phase begins to travel upward toward an environment of reduced pressure at the surface of the well. As pressure decreases toward the surface, gas contained in the well's tubulars expands, and the velocity of the gas increases accordingly. As a result, the expanding gas acts as a carrying mechanism to continually remove the formation water from the well. However, as reservoir pressure decreases in response to continued gas production and/or water volumes entering the wellbore continue to increase, the ability of the gas to carry and remove formation water from the well is greatly reduced. As this phenomenon begins to occur, the relatively dense formation water begins to "fall back" into the well. Eventually this water will fill the well's tubing to the point that the hydrostatic pressure created by the water column approaches the prevailing reservoir pressure, and the productivity of the well is significantly reduced. Increasing water encroachment and/or continued pressure declination results in the eventual cessation of production.

The second basic factor, which is typical of Gulf Coast oil and gas production, is the common occurrence of unconsolidated sandstone reservoir rock formations. In this type formation, sand grains (which make up the sandstone rock) do not contain adequate intergranular cementation or rock strength to ensure rock stability during the production of oil and gas. As a result, the rock, in its natural state, often fails when subjected to the stresses imposed on it during the production mode. Small rock fragments are then produced into the wellbore. Once accumulated in the wellbore or well tubulars, this fine grain material possesses a permeability that approaches zero, and well productivity is greatly reduced.

Various techniques to increase the stability of the sandstone reservoir rock (or methods of "sand control") have been employed through the years. One common method of sand control which was employed extensively during the nineteen sixties and early seventies was the pumping of a compound through the formation pore spaces that, once cured, would coat the sand grains and add "artificial" grain-to-grain cementation. Thus, the overall rock strength was increased in the treatment area. This method of sand control had a positive effect on dealing with the previously mentioned problem of natural water encroachment into a well's producing interval. The completion interval utilizing this method of sand control remains essentially free of downhole mechanical equipment. Therefore, at the point in time when water moves into the completion interval, an attempt can easily be made to "plug-back" the lower portion of the well. This is accomplished by lowering, on electrical wireline equipment, an expandable plug through the well's production tubing and into the cased region of the well. The plug is positioned immediately beneath the completion interval, and the plug is expanded to contact and affix itself to the casing wall. Once in place, the plug acts as a "bottom" such that commonly used oilfield cement can be placed on top of the plug to the desired height in the well. The placement of cement up to or above the oil- or gas-water contact in the reservoir, if successful, has a limiting effect on water production.

With the advancement of alternate sand control techniques, there came into use a new and preferred method of sand control commonly referred to as "gravel packing." The widespread use of this technique occurred in the nineteen seventies and is presently the sand control method of choice in most areas of the world. Gravel packing is a system in which uniformly sized and shaped sand grains are placed in a well's perforations and in the annular volume between the well's production casing and a slotted or perforated pipe, which is externally wrapped with wire. The sand grains, or "gravel," are slightly larger than the formation sand particles, and since they are tightly "packed" together, they prevent the collapse of the perforation tunnels and act as a filter to prevent the migration of formation sand into the wellbore. The wire wrapped or slotted "screen" is normally placed between two packers and contains the sand in an area adjacent to the perforated interval and prevents the movement of the gravel into the production tubing.

In the event that formation water moves into the completion interval, the "plug-back" method previously described is ineffective in reducing water production. The reason for this is that particulates in the common oilfield-type cement "plate out" and bridge off at the gravel pack sand face. Only the liquid (usually water) filtrate of the cement effectively permeates the gravel pack sand, and the cement dehydrates and cures as a plug inside the screen and slotted or perforated blank pipe. Even if the cement plug is spotted properly in the water-bearing portion of the producing interval, the formation water will simply flow vertically upward in the annular gravel-packed area surrounding the plug; and, if this distance is not sufficient in length, the cement plug will have very little effect on reducing water production.

For similar reasons, the placement of a mechanical plug inside the slotted or perforated blank pipe yields similar results. In this case, formation water enters the wellbore below the plug (which is set at a depth just above the oil- or gas-water contact) and travels "around" the plug, utilizing the high flow capacity annular area between slotted or perforated pipe and the screen. The limited effect of both of the above-mentioned methods to reduce water production from the lower portion of a gravel-packed well has led to the method of this invention.

PRIOR ART

U.S. Pat. No. 4,042,031 to Knapp discloses a method for plugging formations with epoxy emulsions containing fine solid particles. A dump bailer is used for selectively placing the slurry into the lower perforations.

U.S. Pat. No. 4,034,811 to Sparlin et al. discloses a method for sealing permeable formations. The method comprises: (1) introducing sand to the wellbore to a level below the zone to be sealed, (2) adding gravel to the annular space between the wellbore and the slotted liner, (3) adding polymeriziable material and acidic catalyst to the wellbore at the zone to be sealed and allowing polymerization to take place, and (4) removing polymerized material and catalyst from the slotted liner.

U.S. Pat. No. 3,709,296 to Glenn, Jr., discloses a method and apparatus for plugging a wellbore zone. The apparatus comprises a bailer and a gamma ray logging tool. The method comprises lowering the bailer containing a catalyst and a polymeriziable material into the wellbore to the zone to be plugged and displacing the mixture into the zone where it hardens.

U.S. Pat. No. 3,933,204 to Almquist discloses a method for plugging a permeable formation by injecting into the formation an aqueous emulsion containing epoxy and carboxy polymers which harden to form a plug.

SUMMARY OF THE INVENTION

According to this invention, a mixture of a liquid epoxy material and a hardener for the epoxy material are delivered to a zone in a well which is to be plugged. The mixture is thereafter displaced into said zone where it is allowed to harden and plug off said zone. The mixture of liquid epoxy material and hardener is characterized in that:

1. The epoxy material has a density greater than the density of the well fluids.
2. The epoxy material has a low viscosity at the downhole conditions of temperature and pressure.
3. The epoxy material is immiscible with the well fluid. 4. The epoxy material is essentially free of solids. 5. The hardener has an activation temperature lower than the formation temperature at the zone to be plugged. 6. The set time of the epoxy material is of short duration at downhole conditions of temperature and pressure.

In one aspect of the invention, the mixture of epoxy material and hardener is introduced to a gravel-packed zone to seal off the production of water.

In another aspect of the invention, the mixture of epoxy material and hardener is delivered to the zone to be plugged with a bailer.

DETAILED DESCRIPTION OF THE INVENTION

In carrying out the process of the invention, a mixture of an epoxy material and a hardener for the epoxy material are delivered adjacent to a zone in a well which is to be plugged and the mixture is thereafter displaced into the zone and allowed to harden. The process is particularly applicable to oil and gas wells containing gravel packs where water encroachment has led to advancement of water into the producing interval so that the well produces excessive quantities of water over a period of time. By plugging off the water zone, it is possible to reduce or even eliminate the flow of water, thus restoring the desired production of oil and/or gas from the well.

Figure 1:
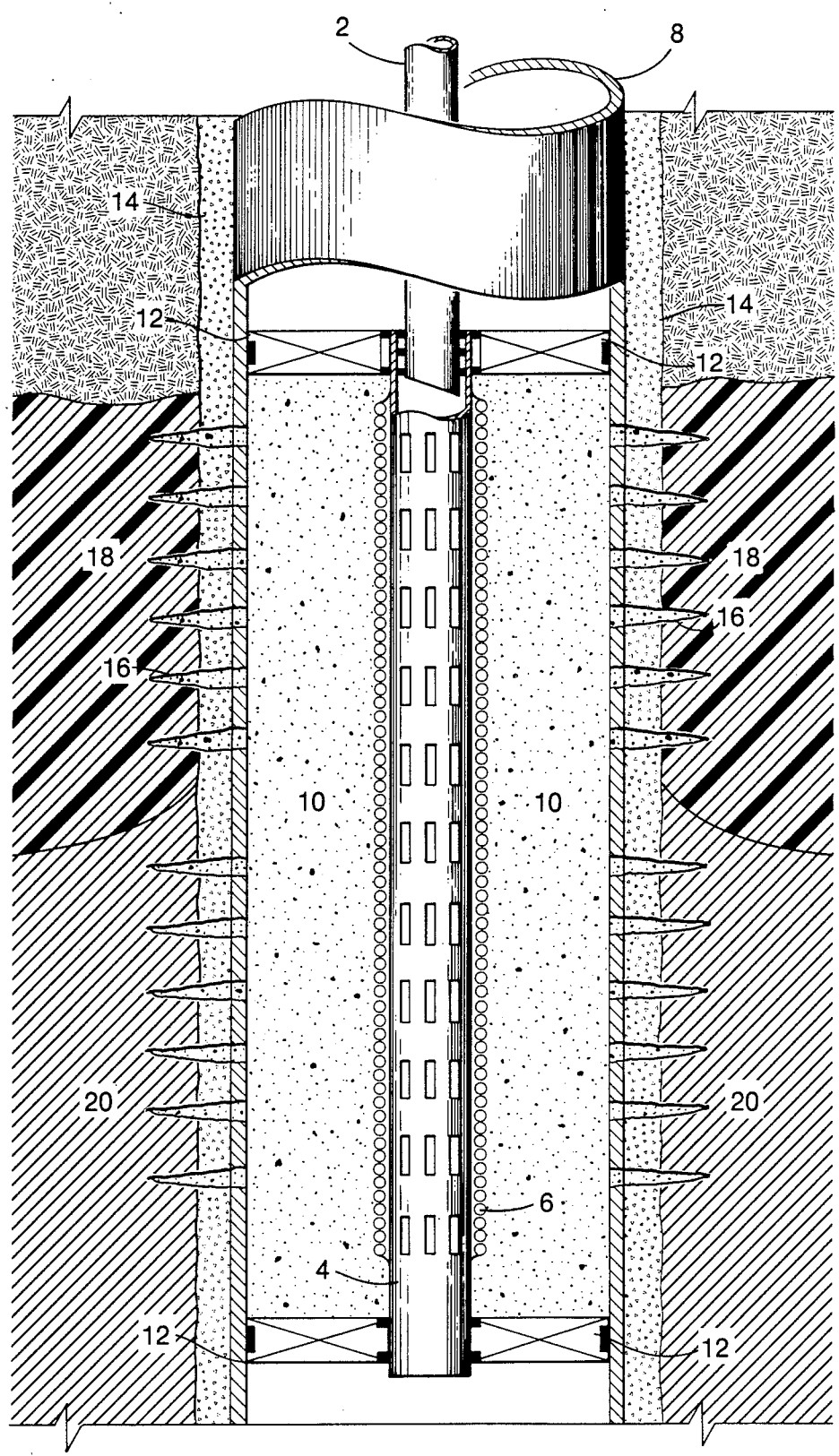
FIG. 1 is a sectional view of a typical wellbore containing gravel packing.

The process of plugging off a water formation in such a well may be described by reference to the drawings. Referring to FIG. 1, there is disclosed a subterranean oil or gas zone and a water zone at (18) and (20), respectively. Although these are shown as separate zones, they are not distinct and separate from each other but tend to merge one zone into the other. Traversing these zones is a producing well having an outer production casing (8) and inner production tubing (2). A portion of the well adjacent zones (18) and (20) is isolated from the remainder of the well by upper packer (12), which is placed between tubing (2) and casing (8), and lower packer (12) between slotted tubing (4) and production casing (8). Contained in this isolated area is a slotted tubing (4), which is somewhat larger in diameter than production tubing (2). Around the outside of slotted tubing (4) is a wire-wrapped screen (6), which is supported and spaced from the slotted casing by vertical rods (not shown). The isolated section of casing (8), which surrounds slotted tubing (4) and wirescreen (6) is filled with gravel (10). This gravel fills not only the casing but also the perforations (16) extending from the casing through the primary cement (14) around the casing and into zones (18) and (20).

It is desirable that the well remain dormant during the operation of the process. If the well does not remain dormant, downhole fluid movement, or "cross-flow," between sand beds within the completion interval may cause the epoxy to be dispersed into portions of the well which do not require plugging. Also, the epoxy plug can become "honeycombed" if formation fluid continues to trickle into the wellbore before the epoxy is completely hardened. If the well is not dormant, that is if there is fluid flow, the flow may be eliminated or minimized by filling the well with fluid and maintaining a positive pressure; e.g., from about 300 to about 500 psi at the surface of the well. The fluid used may be fresh water, formation brine, seawater, or any other formation-compatible material. When formation fluid naturally exists in the bottom of the well or when fluid has been placed in the well, the near wellbore area becomes sufficiently saturated that the migration of oil or gas into the wellbore is minimized. The first step of the process, therefore, is to ensure that the well remains essentially dormant.

In the next step of the process, liquid epoxy and hardener are mixed together to form a liquid mixture and are introduced into the well and placed at a point adjacent to the gravel-packed zone (10). The hardener which is mixed with the epoxy material has an activation temperature which is somewhat less than the formation temperature in the area of the gravel-packed zone. The activation temperature is the temperature at which the hardener initiates reaction of the epoxy material. Since the temperature in the well gradually increases from the top of the well down to the formation to be plugged, it is desirable to place the mixture of epoxy material and hardener at the point of use as quickly as possible, thus ensuring that the epoxy material does not begin to harden until it is placed in the area of the zone which is to be plugged.

One method for moving the mixture of epoxy material and hardener to the desired location is to use a positive displacement dump bailer. This is a mechanical device cylindrical in shape, which is filled with the mixture of epoxy material and hardener and lowered into the well on a cable. The bailer is positioned at the desired depth and when activated, releases a metal bar in the top of the device. The bar falls downward inside the device and impacts the top of the fluid creating a downward-moving shock wave which travels through the fluid column contained by the bailer. The shock wave causes the shearing of metal pins in the bottom of the bailer and subsequent downward movement of a small piston which uncovers ports to allow the release of the contained material. The metal bar continues to fall through the bailer as fluid is released through the ports. The weight of the metal bar effectively adds to the weight of the fluid column being dumped. As the bar falls to the bottom of the bailer, the cylindrical bailer tube is wiped clean of the epoxy material/hardener mixture.

Other types of positive displacement dump bailers, which operate in a similar manner, may also be used. It is also possible to deliver the mixture of epoxy material and hardener in an open bailer. This is a bailer which is open at the top and closed at the bottom. When activated, the bottom cover, which is held by metal pins, is sheared by an explosive or by other means thereby opening the bottom and allowing the mixture of epoxy material and hardener to flow by gravity from the bottom of the bailer and into the formation.

A coiled tubing may also be used to place the mixture at the desired point in the well. The coiled tubing is a 1-inch or other small pipe which is wound on a spool at the surface of the well. The mixture of epoxy material and hardener is placed in the end of the tubing and held in place by wiper balls at the top and at the bottom of the mixture. The tubing is then uncoiled and lowered into the well to the desired location, after which the mixture of epoxy material and hardener is pressured through the tubing and released at the selected location.

Figure 2:
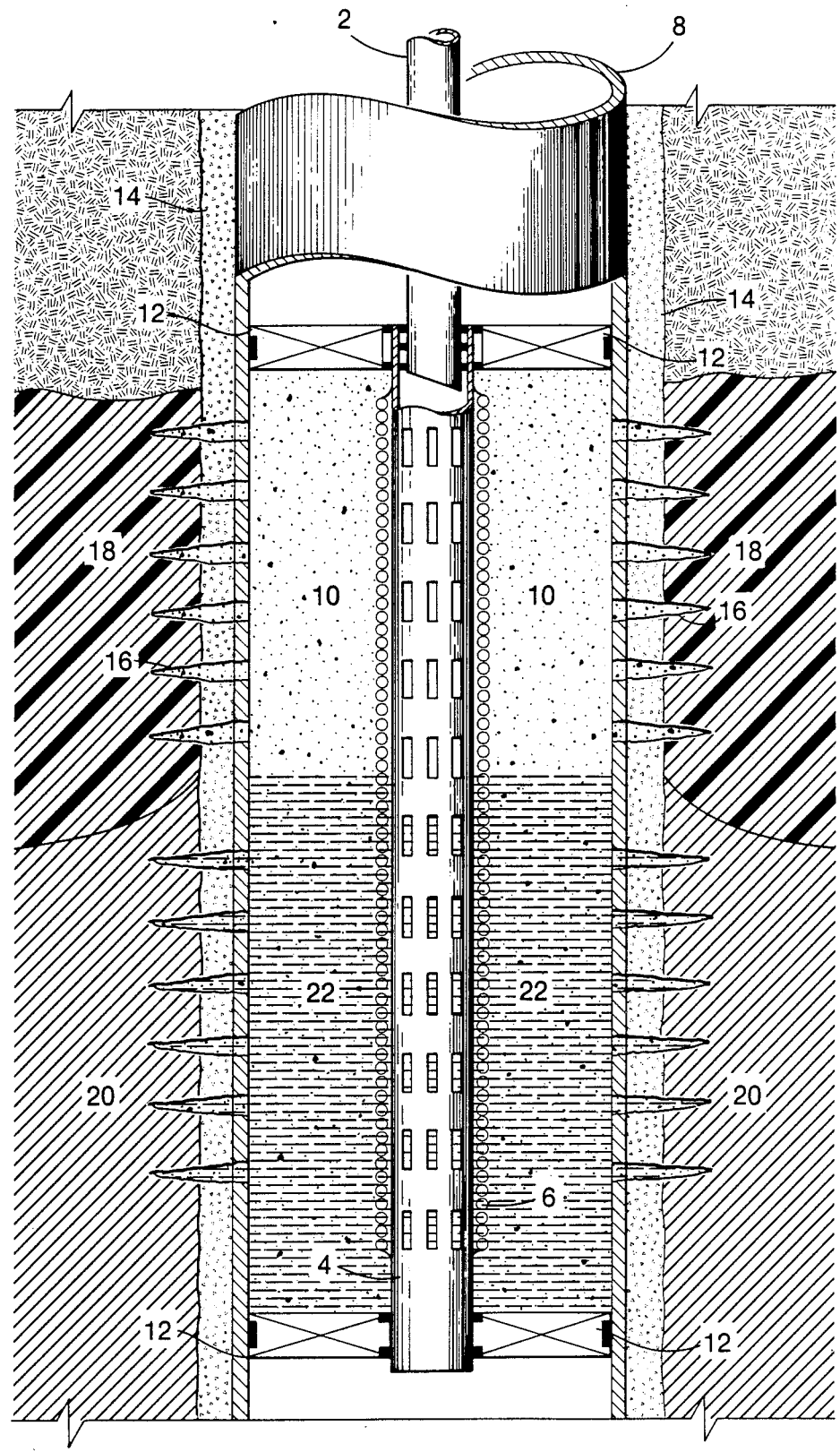
FIG. 2 is a sectional view of the same wellbore after treatment in accordance with the process of the invention.

Referring again to FIG. 1, whatever apparatus is used for the purpose, the mixture of epoxy material and hardener is placed in the apparatus and is delivered as quickly as possible to a point slightly above water zone (20). The apparatus is then activated to release the epoxy material/hardener mixture which flows into slotted tube (4) and from there into the gravel pack (10) and perforations (16). At this point, a small amount of liquid may be pumped slowly into production tubing (2) to "squeeze" the epoxy material into the pore spaces of the formation rock or any voids in the primary cement (14) around the production casing. At the existing downhole temperature, the hardener is activated and the epoxy material begins to react. FIG. 2 shows the same well after the epoxy material has hardened to form a solid plug (22) adjacent water zone (20). This plug fills the slotted pipe, the screen, the gravel, and may even enter the perforations (16) to effectively plug off production of water from zone (20).

The epoxy materials used in carrying out the invention have densities greater than the well fluid, which as previously pointed out, may be fresh water, formation water, or other water containing salts. The epoxy materials are also essentially immiscible with the well fluid. These two properties assure that the epoxy/hardener mixture will not tend to rise through the formation fluid, nor will the mixture be diluted in any way by the formation fluid so as to prevent the epoxy from performing its proper function. Preferably, the epoxy will have a density of at least about 1 to about 1½ pounds per gallon greater than the wellbore fluid.

The epoxy materials used will further have a relatively low viscosity at downhole conditions of temperature and pressure. Thus, the fluidity of the epoxy material and the density difference between the epoxy material and the wellbore fluid will facilitate the almost complete displacement of the wellbore fluid, saturating the gravel-pack in the zone to be treated. The viscosity of the epoxy material is usually between about 500 and about 1 centipoise at downhole temperatures of between about 75 and about 220 degrees Fahrenheit. The epoxy materials used are also essentially free of solids and, therefore, contain no materials to plate out on the gravel-packed sand face as does cement.

The epoxy material goes through several physical stages in the process of the invention. In the first stage, it is a flowable liquid of relatively low viscosity, particularly at higher temperatures. When the temperature of the epoxy material reaches the activation temperature of the hardener, it begins to react and increase in viscosity. Eventually the epoxy material hardens sufficiently that it ceases to flow. The point at which this occurs is called the "set point." With additional time, the epoxy material continues to react and harden until it becomes a solid.

At this point, the epoxy is considered to be "hardened." The time required after the set point for the epoxy material to become hardened is normally of very short duration—usually from between about 2 to about 20 minutes. With still additional time, the epoxy material becomes completely reacted and hardened and is considered to be cured. As with concrete, this final curing stage may take as much as several days, depending on the particular epoxy material/hardener system.

The set time of the epoxy material/hardener mixture should be of short duration Ideally, the epoxy material would begin to harden immediately after the mixture of epoxy material and hardener have had a chance to completely displace the wellbore fluid in the area to be treated. Delayed hardening is undesirable for two reasons. First, if the well does not remain entirely dormant from the time the epoxy material is placed until it is hardened, downhole fluid movement or cross-flow between sand beds within the treated area may cause the epoxy material to disperse into lower or upper portions of the well. Secondly, if the epoxy material remains in an unhardened state, or if the reaction requires an extended period of time to complete, the integrity of the plug can be reduced if formation fluid continues to trickle into the wellbore before the epoxy material is hardened. By proper selection of the epoxy material and hardener, set times for the epoxy material can be predetermined. The set time of the epoxy material will be between about 1 and about 180 minutes and preferably between about 10 and about 60 minutes.

The amount of epoxy material used to plug off a gravel-packed interval depends on the size of the gravel packing and the portion of the gravel pack which it is desired to plug. Usually an amount of epoxy material between about 0.5 and about 2.0 gallons per foot of plugged interval is sufficient. Since the amount of epoxy material which a bailer or coiled tubing can deliver in a single operation is limited, it may be necessary to carry out the delivery process in two or more stages.

The hardener materials used in the process are those which are compatible with the epoxy material in that once the two are mixed, they form a liquid mixture which is substantially free from solids. The hardener material will have an activation temperature, that is the temperature at which the hardener activates reaction of the epoxy material, which is below the temperature existing at the zone which is to be plugged off. The activation temperature of the hardener should not be too much below the downhole temperature, since the initiation of reaction of the epoxy material should not occur until the epoxy material/hardener mixture has had the time to substantially displace wellbore fluid from the formation to be plugged.

The amount of hardener used is sufficient to effect complete reaction of the epoxy material in a reasonable period of time and is between about 1 and 15 parts per 100 parts of the epoxy material, more usually between about 2 and about 6 parts per 100.

Any epoxy material which meets the criteria previously set forth may be used in carrying out the process of the invention. A widely used class of polyepoxides from which the epoxy material may be selected are the resinous epoxy polyethers obtained by reacting an epihalohydrin, such as epichlorohydrin, epibromohydrin, epiiodilydrin, and the like with either a polyhydric phenol or polyhydric alcohol. The resulting resinous products may contain free terminal hydroxyl groups or terminal hydroxy groups and terminal epoxy groups.

Another class of polymeric polyepoxides from which the epoxy material may be selected are the polyepoxy polyhydroxy polyethers obtained by reacting a polyhydric phenol, such as bisphenol A, recorcinol, catechol, and the like, or a polyhydric alcohol such as glycenol, sorbitol, pentaerythritol, and the like with a polyepoxide such as bis(2,3-epoxypropyl) ether, bis(2,3-epoxy-2-methylpropyl) ether, 1,2-epoxy-4,5 epoxypentane, and the like.

Another class of epoxies are the novolac resins obtained by reacting, in the presence of a basic catalyst, an epihalohydrin, such as epichlorohydrin, with the resinous condensate of an aldehyde; e.g., formaldehyde, and either a monohydric phenol; e g., phenol itself, or a polyhydric phenol; e.g., bisphenol A.

Still another class of epoxides are the homopolymers and copolymers of epoxy containing monomers which also contain at least one double bond. Among such ethylenically unsaturated epoxy-containing monomers are vinyl 2,3-glycidyl ether, allyl 2,3-glycidyl ether, glycidyl acrylate, 2,3-epoxypropyl crotonate, glycidyloxystyrene, and the like. Suitable comonomers for copolymrization with these ethylenically unsaturated epoxy-containing monomers include styrene, acrylonitrile, methyl acrylate, vinyl chloride, vinyl acetate, diallyl phthalate, and the like.

Yet another class of epoxides are the di- and tri-epoxides, such as 3,4-epoxycyclohexylmethyl, 3,4-epoxycyclohexene carboxylate, 3,4-epoxy-6-methylcyclohexylmethyl-3,4-epoxy-6-methyl cyclohexane carboxylate, bis(3,4-epoxy-cyclohexylmethyl) maleate, bis (3,4-epoxy-6-methylcylohexyl) methylcylohexyl) methylsuccinate, ethylene glycol bis(3,4-epoxycy-clohexane) carboxylate, 2 ethyl-1,3-hexanediol bis(3,4-epoxy-6-methylcyclohexane carboxylate, and the like.

Another type of epoxides are the glycidyl ethers of alcohols and phenols, including such compounds as the diglycidyl or triglycidyl ethers of trimethyl propane, the diglicidyl ethers of 1,4 butanediol, 1.6 hexanediol, neopentylglycol, resorcinol, hydroquinone, catechol, bis (hydroxyphenyl) methane, and the like.

Other monomeric polyepoxides which may be used include dicyclopentadiene dioxide, epoxidized triglycerides such as epoxidized glycerol trioleate, epoxidized glycerol trilinoleate, the diacetate of epoxidized glycerol trilinoleate and the like, 1,8-bis(2,3-epoxypropoxy)octane, 1,4-bis(2,3-epoxypropoxy) cyclohexane, 1,4-bis(3,4-epoxybutoxy)-2-chlorocy-clohexane, 1,3-bis(2,3-epoxypropoxy)benzene, 1,4-bis(2,3-epoxypropoxy)benzene, 1,3-bis(2-hydroxy-3,4-epoxybutoxy)benzene, 1,3-bis(4,5-epoxypentoxy)-5-chlorobenzene, 4,4'-bis(2,3-epoxypropoxy) diphenyl ether, and epoxy ethers of polybasic acids such as diglycidyl succinate, diglycidyl adipate, diglycidyl maleate, diglycidyl phthalate. diglycidyl hexachloroendomethylenetetrahydrophthalate, and diglycidyl 4,4'-isopropylidenedibenzoate.

It will be appreciated by those skilled in the art that the epoxides used in carrying out the invention are not limited to those selected from the above-described materials, but that said epoxides are merely representative of the class of epoxides as a whole.

The hardeners which are used in carrying out the process of the invention may be either liquids or solids. If present in the solid state, they may be melted and combined with the liquid epoxy material or they may be converted to fine solids; e.g., by grinding, and then combined with the epoxy. In any event, the final mixture of epoxy material and hardener is a liquid and is characterized as being substantially free of solids.

Any hardener which has an activation temperature lower than the formation temperature at the zone to be plugged may be used. Examples of hardening agents are aliphatic and aromatic polyamines, acid anhydrides, the hydrazides derived from polycarboxylic acids, imidazole derivatives, dicyanodiamide, guanidine derivatives, and biguanidine derivatives. Typical examples of those hardeners are diaminodicylomethane, bis(4-amino-3-methylcyclohexyl) methane, diaminodiphenylmethane, diaminodiphenyl-sulfone, 4,4' diamino-3,3'-dichlorodihexylmethane, phthalic anlydride, chlorendic acid, and the like.

Hardeners which may be used also include primary and secondary polyamines, such as diethylene triamine, triethylene tetramine, tetraethylene pentamine, aminoethyl ethanolamine, hydrazine, ehtylene diamine, 1,3-propanediamine, 1,4-butane diamine, 1,6-hexane-diamine, 3,3'-imino-bispropylamine, 1,2-propane diamine, 1,5-pentane diamine, phenylene diamine, and tertiary amines characterized by the formula:

Wherein R, R', and R" are the same or different organic radicals such as dimethylethanolamine, dimethylpropylamine, dimethylbutylamine, dimethyloctylamine, dimethylethylamine, mono-methyl-diethylamine, diethylethanolamine, dimethyl decyl amine, monomethyl ethyl butyl amine, monomethyl dibutyl amine, monomethyl diprophyl amine, NN-dimethyl amino butyl amine, NN-dimethyl-amino hexyl amine, NN-diethyl amino butylamine, tetramethyl ethylene diamine, tri-methyl ethylene diamine, tetramethyl propylene diamine, tetraethyl ethylene diamine, triethyl ethylene diamine, tetraethyl propylene diamine, NN-diethylamino ethylamine, dimethylamino-propylamine, diethylamino-propylamine, dimethylaminomethyl phenol, and tri-(dimethyl-aminomethyl) phenol.

Other hardeners which may be used, some of which fall under the above classes of materials, are dicyanamide, thioameline, sodium phenylcyanamide, dithiobiurel, ethylenethiourea, dialkylmelamine, acetoguanamine, melamine, guarylurea, benzoguanamine, benzoyldicyandiamide, guanazole, 3-aminio-1,2,4-triazole, monomethyloldicyandiamide, thiosemicarbazide, adipamide, adipyl dihydrazide, isophthalyl diamide, isophthalyl dihydrazide, triaminomelamine, tetraminoditolylmethane, diamioacridine, phenylbiguanide, semicarbazide, 2-oxoimidazoline-4,5-diacarboxamide, oxaldiimidic acid dyhydrazid, oxamidedioxime, diaminomaleonitrile, 2,3-diamino-5,6-dicyanopyrazine, stearic hydrazide, succiminide, and cyanoacetimide.

Still other hardeners include such materials as boron trifluoride-organic amine adducts; e.g., boron trifluoride-amine complex, containing p-chloromiline and triethylene glycol The foregoing materials are not limiting; any hardener may be used which meets the previously described general requirements.

The following examples illustrates the results obtained in carrying out the invention:

EXAMPLE 1

Figure 3:
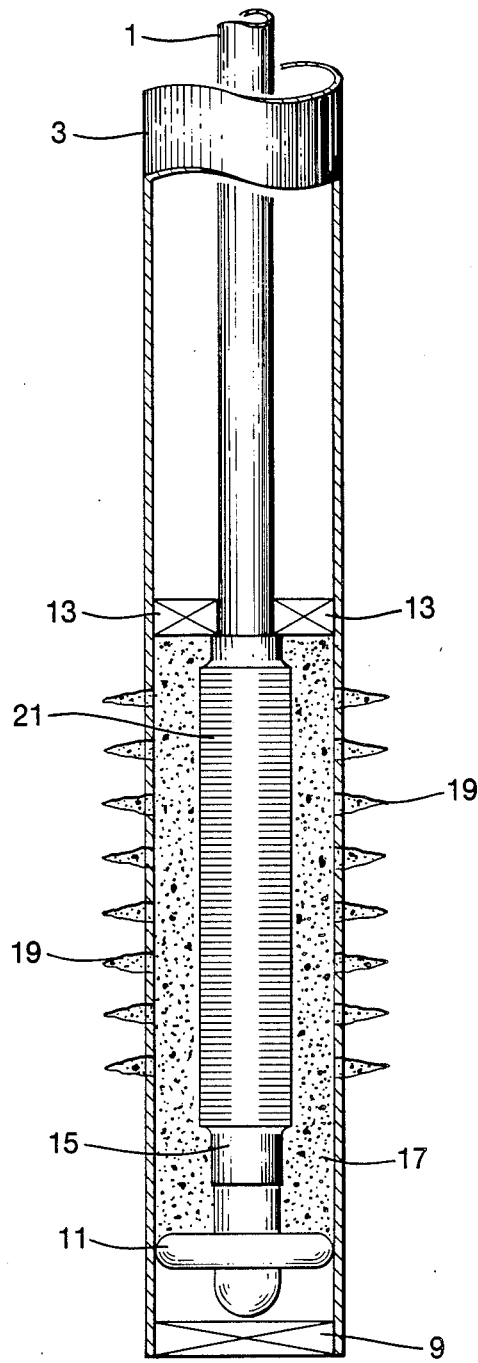
FIG. 3 is a sectional view of a wellbore utilized in conjunction with a field test procedure.

The well shown schematically in FIG. 3 is producing through perforations (19) at 10,234 feet to 10.288 feet. The well has a bottom-hole temperature of 200° F. and a bottom-hole pressure 4,918 psi. The last test on the well showed a gas production of 2,428 mcfd, an oil condensate production of 36 barrels per day, and a water production of 1,336 barrels per day. Referring to the drawing, 3½-inch production tubing (1) is connected in the bottom of the well to a slotted tubing (15) which is covered with 64 feet of 3½-inch, 8-gauge screen (21). A 7⅜-inch production casing (3) is filled with gravel (17) which surrounds the lower portion of production tubing (1) and the screened slotted tubing (15). The extent of the gravel pack is defined by an upper packer (13) around the production tubing and a bull plug with centralizer (11), which seals off the bottom of the screened slotted tubing and the production casing and which rests on a bottom packer (9) which had been previously placed in the well.

To seal off the water producing zone, which is in the lower portion of the production interval, the following procedure was followed:

1. The production tubing (1) was filled with salt water and pressured to provide a top pressure of approximately 515 psi. It was important that the well remain full; therefore, the tubing and casing pressures were monitored before the treatment was carried out to ensure that the well remained relatively static for at least four hours.
2. A 72-foot positive displacement bailer was lowered into the well and loaded from the top with five gallons of Heloxy-69 epoxy material containing 3.94 parts of Ancamine K-61-B hardener per 100 parts of epoxy material Heloxy-69 is a resorcinol diglycidyl ether marketed by Wilmington Chemical Corporation of Wilmington, Del. The Ancamine K-61-B hardener, which has an activation temperature of 170° F. to 180° F., is a modified tertiary amine marketed by Pacific Anchor Chemical Company of Los Angeles, Calif.
3. The dump bailer containing the mixture of epoxy material and hardener was run into the hole quickly to a position 20 feet above the lowest perforation. The dump bailer was then actuated to displace the epoxy material/hardener mixture.
4. After the epoxy material/hardener mixture has had time to completely dump, the bailer was held stationary for several minutes and then pulled very slowly from the well. In order to keep the production tubing liquid full, additional liquid was added while the bailer was being removed to replace the volume occupied by the line attached to the bailer.
5. The epoxy material was allowed to harden for approximately four hours.
6. After cleaning, the bailer was filled with 9½ gallons of epoxy material containing the same amount of hardener which have been thoroughly mixed.
7. The bailer was again run into the well quickly to a depth of about 35 feet above the lowest perforation and dumped again. After allowing time for the bailer to completely dump, one barrel of salt water was slowly pumped into the well.
8. The bailer was again slowly removed from the well with the well being maintained liquid-fluid full by replacing fluid displaced by the line connected to the bailer.
9. The epoxy material was again allowed to harden for approximately four hours.
10. The well was subsequently returned to production, and a test was carried out to determine production rates. As a result of the epoxy material treatment, the gas production was 1011 mcfd, the oil production was 132 bpd, and the water production was reduced to 928 bpd.

EXAMPLE 2

Figure 4:
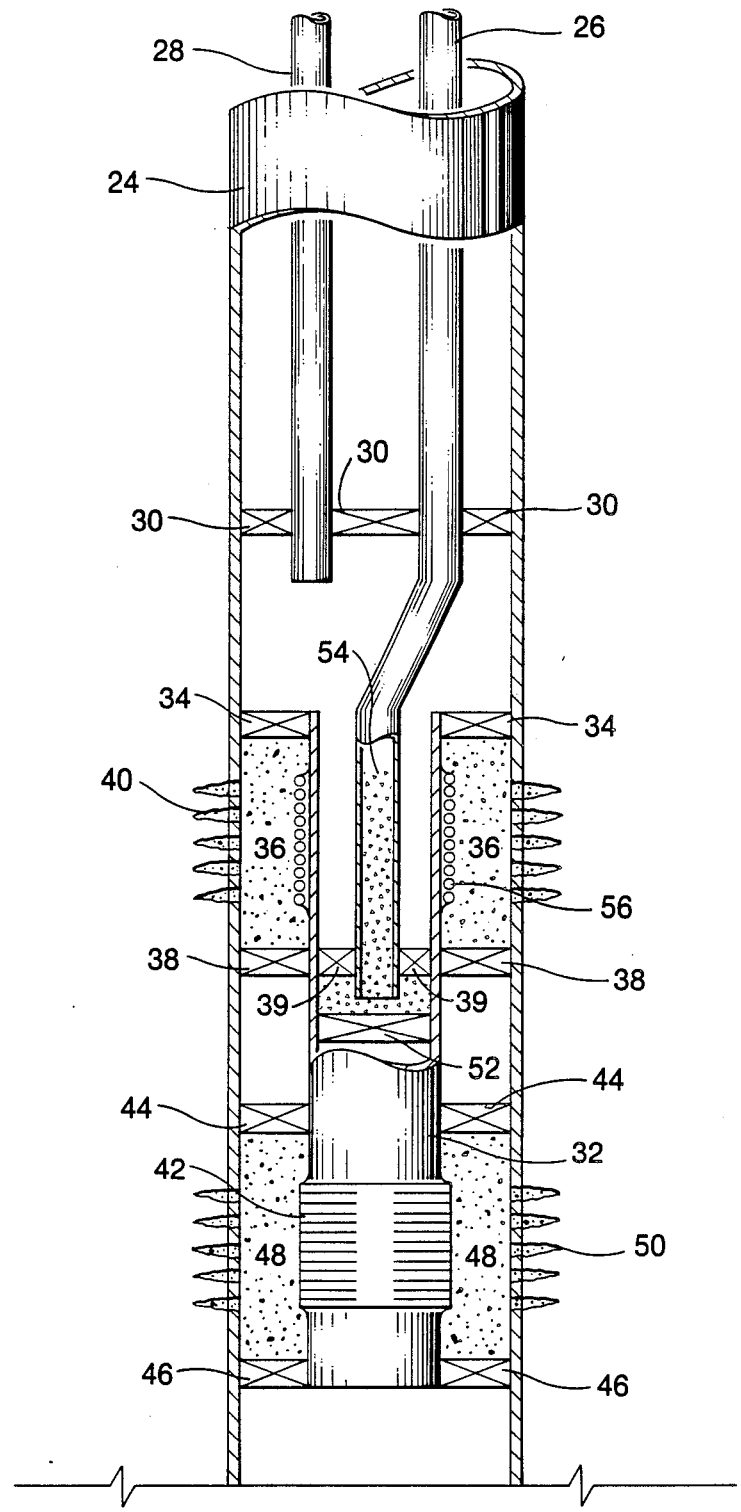
FIG. 4 is a sectional view of a well bore having dual completion zones.
Figure 5:
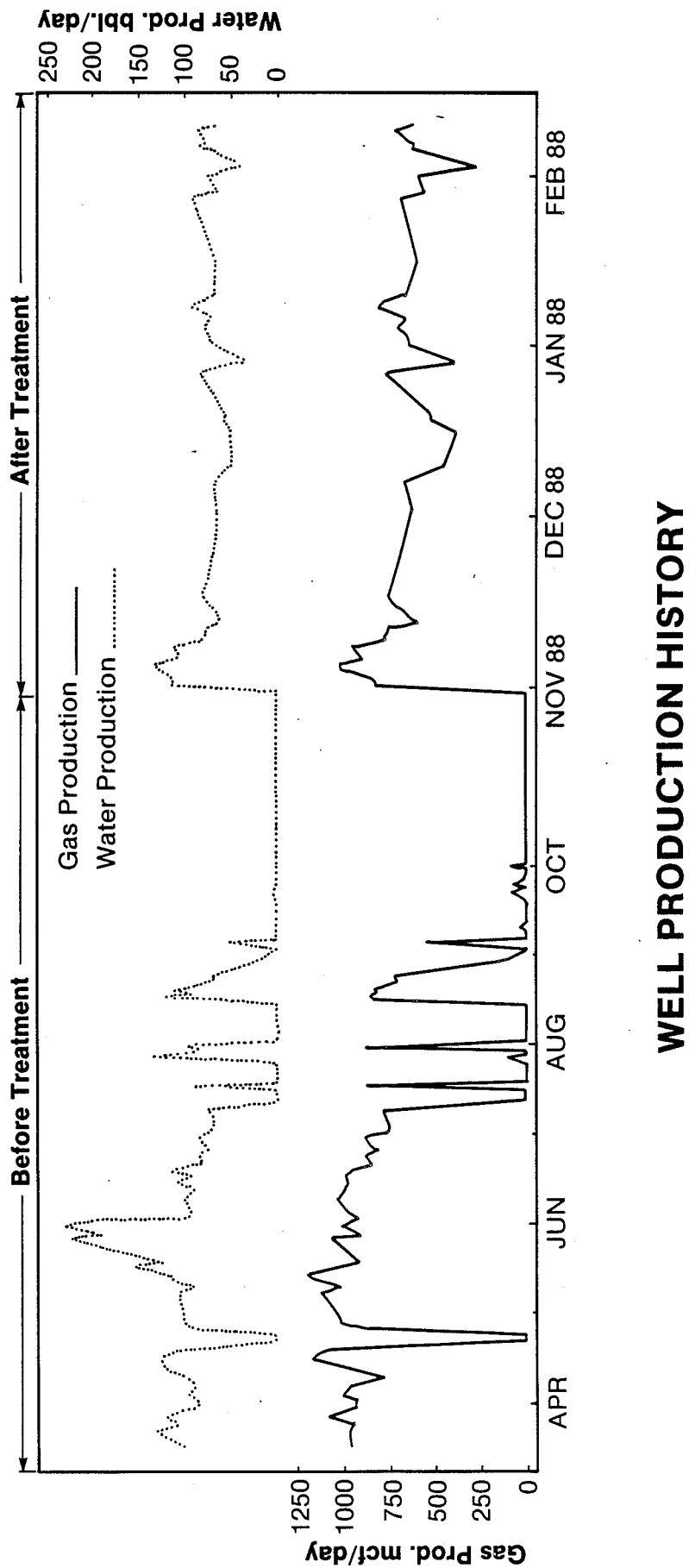
FIG. 5 is a graph showing producing results of a well which had been treated in accordance with the method of the invention.

The well shown schematically in FIG. 4 had produced gas intermittently since mid-July 1988 because of the combination of reduced reservoir pressure, water production, and high pipeline pressure. The production data showed that when the pipeline pressure exceeded 1,000 psi, gas production stopped completely because excess-produced water from a strong natural water drive loaded up the production tubing. Sporadic attempts to flow the well during the period from August to November were unsuccessful. Production figures for this time period are shown in FIG. 5.

Referring to FIG. 4, the well contains 2⅜-inch production tubings (26) and (28) disposed within a 7⅝-inch production casing (24). Production tubing (28), which terminates at a depth of 3,662 feet, is spaced from production casing (26) by a dual packer (30), which is located at a depth of 3,647 feet. After passing production tubing (28), production tubing (26) makes a bend and continues down the center of the production casing to a depth beyond packer (38), which is placed at 3,967 feet. Extending downwardly from packer (34) at 3.794 feet to a packer (46) at a depth of 5,549 feet is a 3¼-inch tubing (32) which surrounds production tubing (26). At a depth of 3,924 to 3,968 feet, the 3¼-inch tubing is slotted and is surrounded by 8-gauge screen (56), which is spaced from the tubing with vertical rods (not shown). The space around the screened tubing, defined by packers (34) and (38), is filled with a gravel pack (36). Another packer (39) is provided between tubing (26) and tubing (32) at the same depth as packer (38). The well is being produced through perforations (40) at 3,930 to 3,962 feet. The well was previously produced through perforations (50) at 5,524 to 5,542 feet from a gravel pack (48) surrounding a similar screen-slotted tubing (42). This gravel pack was defined by packers (44) and (46). The lower completion was plugged off previously by placing a packer (52) below production tubing (26) and cementing this tubing and the surrounding tubing (32). The top of the cement extended upwardly into tubing (26) to (54) a level of 3,918 feet.

To solve the water problem, it was originally proposed to treat the well by perforating production tubing (26) above the top level of the cement (54) and thereafter introduce the mixture of epoxy material and hardener through such perforations into gravel pack (36) to seal off the lower 10 feet of perforations (40). When a preliminary test was made with a bailer, it was found the bottom of the tool could not go below 3,897 feet because of an obstruction in tubing (26). Also, when the bailer was pulled to the surface, it was found that the material contained therein was a highly viscous brine loaded with cement fines. Because of the difficulty encountered in trying to reach the cement plug at 3,918 feet and the contaminated fluids in the wellbore it was concluded to treat the well through production tubing (28). It was decided to plug the gravel pack (36) from the packer (38) into the perforated interval (40) at 3,952 feet. This would effectively isolate the bottom 10 feet of perforations (40). Since the bottom of the bailer could not pass beyond packer (34), it would be necessary to release the mixture of epoxy material and hardener at this point, a distance of 158 feet above packer (38).

In November, it was decided to commence treatment of the well. At the time of the treatment, the temperature at perforations (40) was 125° F. The shut-in tubing pressure of the well was 1,250 psi, and the gas/water contact was located at 3,100 feet. In the first step of the treatment, a 51-foot bailer, having a capacity of 3.43 gallons, was loaded with a mixture of Heloxy 69 epoxy material containing 3.0 parts per hundred part of epoxy and hardener Ancamine 1110, a modified tertiary amine marketed by Pacific Anchor Chemical Company of Los Angeles, Calif. The bailer was then lowered into production tubing (28) until it reached packer (34). At this time, the bailer was activated to release the mixture of epoxy material and hardener. Ten minutes after firing, the bailer was slowly pulled out of the tubing. The pick-up rate was increased after the gas/water level in the tubing was reached. On each of the next two days, the process was repeated so that a total of 9.88 gallons of epoxy material was placed at the desired location.

The following day, the well was placed back in production. During the next several months, the well averaged a water production of about 60 barrels per day and a gas production of about 550 MSCF per day. It is noted from FIG. 5 that the water production was substantially reduced by the epoxy treatment. In the immediate period prior to the treatment, the water production averaged over 100 barrels per day. While the gas production after treatment did not reach the level previously attained before the well encountered water problems, the treatment did make it possible to obtain substantial gas production; whereas, before treatment, no gas could be produced at the existing pipeline pressure of 1,000 psi or higher. It is noted that all of the data illustrated in FIG. 5 was obtained at a pipeline pressure at or exceeding 1,000 psi.

The example illustrates that it is possible to carry out the treating process of the invention even though the epoxy/hardener mixture cannot be released in close proximity to the zone or area which is to be plugged. As noted in the example, the mixture of epoxy and hardener was released 158 feet above the desired delivery point.

While the invention has been described in its specific application to a gravel-packed well, it is not limited to such use. The precise placement method disclosed herein may be used to plug any type of zone or formation in a well. Ordinarily, a single epoxy material is used in the process. However, it is within the scope of the invention to use mixtures of different epoxys, particularly as this may be advantageous in obtaining the desired density difference between the epoxy material and the well fluid. Many of the epoxy materials are viscous at well surface temperatures. To facilitate mixing with the hardener and introducing the mixture into the bailer, it may be desirable to heat the epoxy material to a temperature above ambient, usually, however, not higher than 110° F. to 120° F.

While certain embodiments and details have been shown for the purpose of illustrating the present invention, it will be apparent to those skilled in the art, that various changes and modifications may be made herein without departing from the spirit or scope of the invention.

We claim:

1. A method of selectively plugging the lower portion of a gravel packed production zone of a well bore penetrating a subterranean formation, said gravel packed production zone including a tubing section with openings therein and with a wire-wrapped screen around the outside thereof extending along the length of said tubing section, said gravel packed zone being isolated from the remainder of said well bore by packer means, and including gravel packed in said production zone outside said wire-wrapped screen, said method comprising the steps of:
   (a) mixing an epoxy material and a hardener for the epoxy material to form a liquid mixture, the mixture being characterized in that:

(1) the liquid mixture has a density greater than the density of the well fluid;
(2) the liquid mixture has a low viscosity at downhole conditions of temperature and pressure;
(3) the liquid mixture is immiscible with the well fluid;
(4) the liquid mixture is essentially free of solids;
(5) the hardener has an activation temperature lower than the formation temperature of the zone to be plugged; and
(6) the curing or hardening time of the epoxy material is of short duration at downhole conditions of temperature and pressure;

(b) introducing said liquid mixture into said tubing section whereby said mixture settles to the lower portion of said production zone and flows outwardly through the lower portion of said tubing section, the lower portion of said wire-wrapped screen, and the lower portion of said gravel packed zone; and
(c) allowing said liquid mixture to harden in place, thereby selectively plugging the lower part of said gravel packed zone and preventing flow of formation fluid from the lower part of said production zone into said tubing section.

* * * * *